Oct. 6, 1931.     F. LOSKE     1,826,556
AIRCRAFT PARACHUTE
Filed May 5, 1931     3 Sheets-Sheet 1
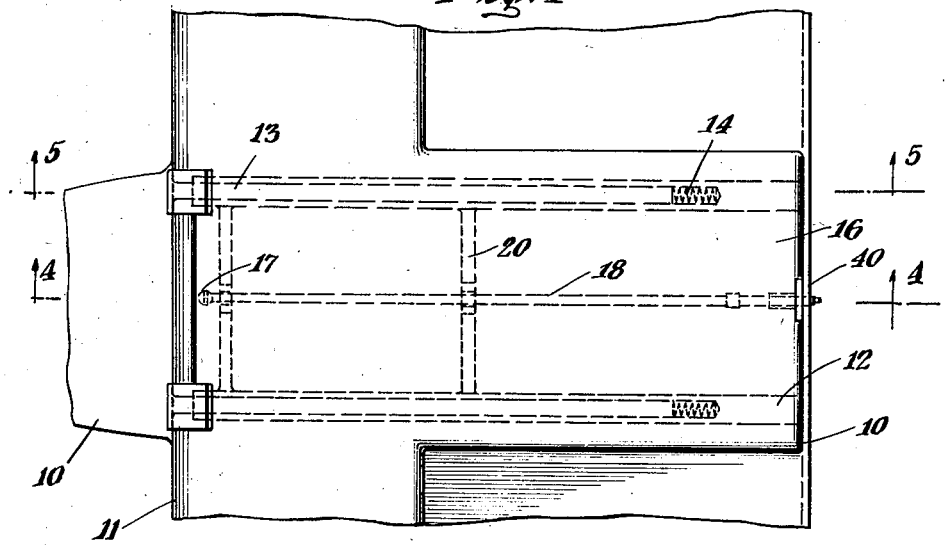
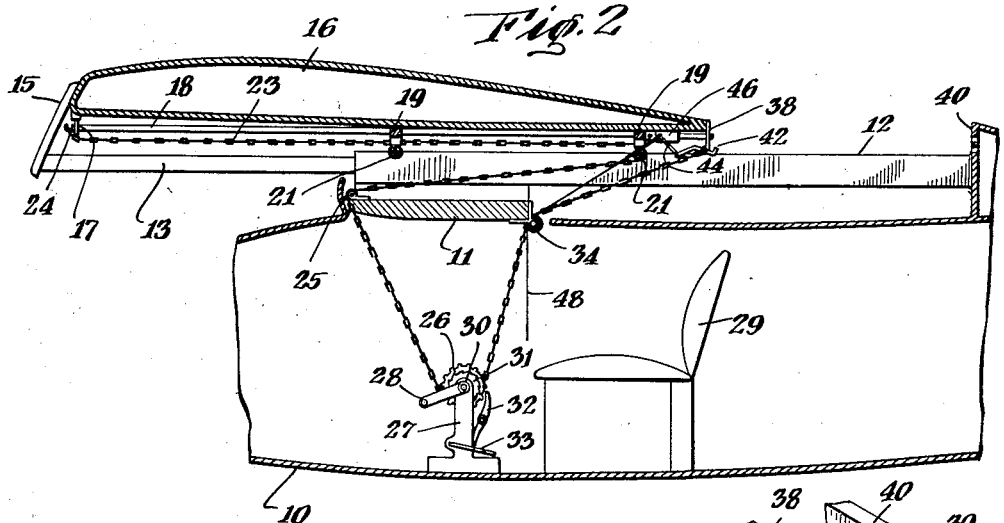
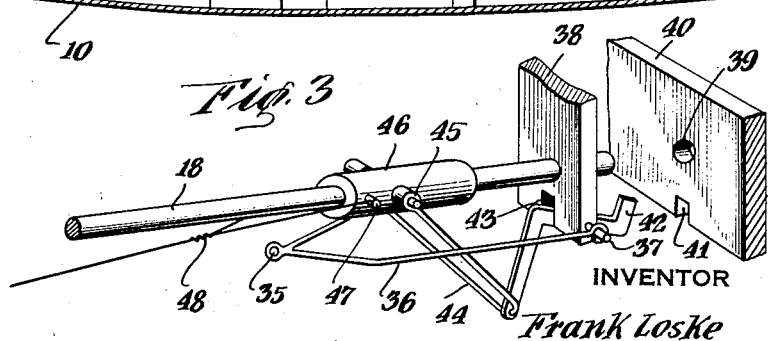
INVENTOR
Frank Loske
BY HIS ATTORNEY

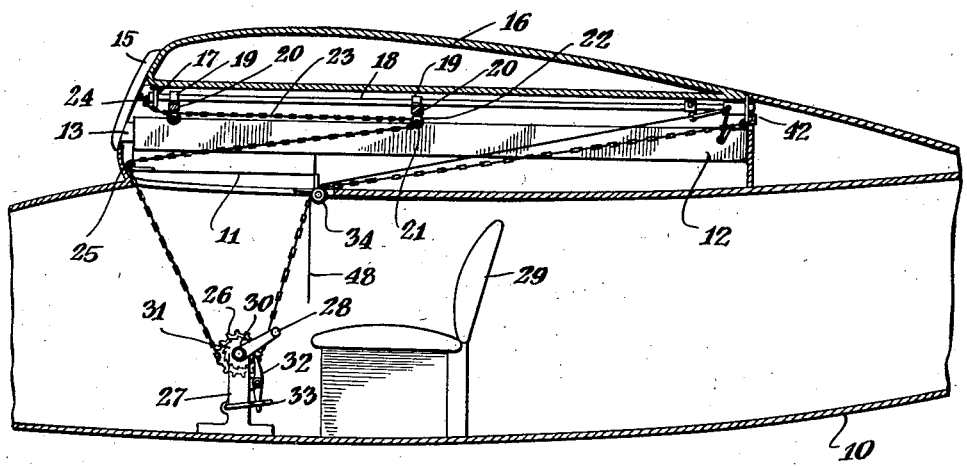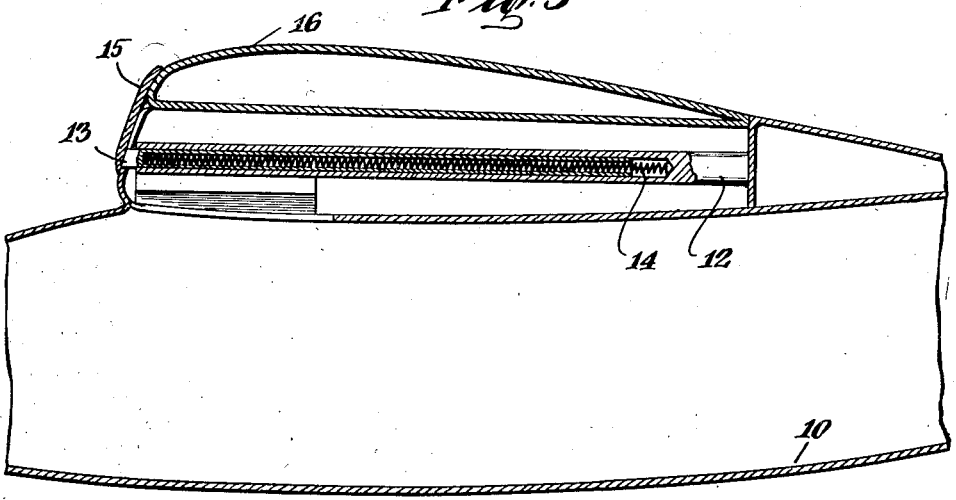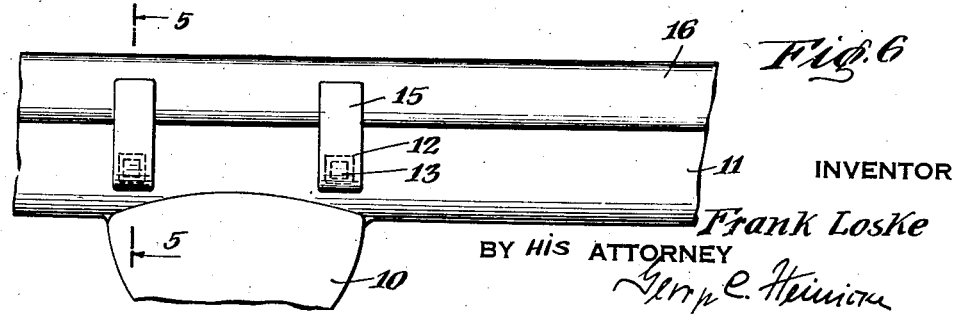

Oct. 6, 1931.  F. LOSKE  1,826,556
AIRCRAFT PARACHUTE
Filed May 5, 1931  3 Sheets-Sheet 3
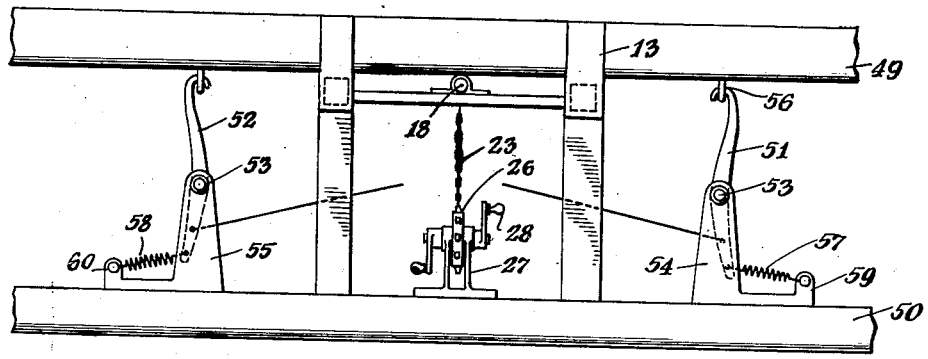
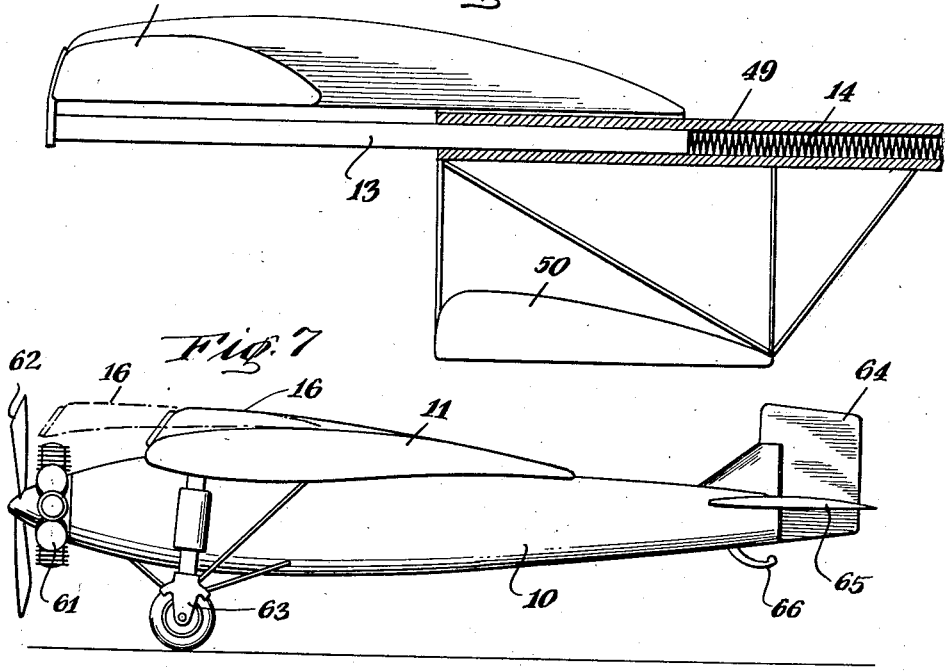
INVENTOR
*Frank Loske*
BY HIS ATTORNEY Patented Oct. 6, 1931

1,826,556

UNITED STATES PATENT OFFICE

FRANK LOSKE, OF BROOKLYN, NEW YORK

AIRCRAFT PARACHUTE

Application filed May 5, 1931. Serial No. 535,135.

This invention relates to improvements in aircraft, and it is the principal object of my invention to provide a craft with parachute means tending to righten the craft and keep the same floating in the air so that it may be brought safely to the ground if the engine stalls or for any other reason an emergency landing is to be made.

Another object of my invention is the provision of a parachute airplane with the wing of which a gas container is so connected that in case of emergency it will instantaneously be displaced so as to project beyond the front part of the wing or wings of the airplane to balance and righten the airplane, if it is for instance going into a nose-dive.

It is well known that the front part of an airplane is comparatively heavier than the rear part of same owing to the presence of the motor, other machinery operated thereby and the pilot, etc., and that a nose dive is mostly to be feared. It is the object of my invention to overcome this disadvantage and danger by simple and readily acting means positively preventing disaster and tending to let the airship float safely to a landing on land or water.

Still another object of my invention is the provision of an aircraft the wing of which is either carrying a gas container or is formed itself as such, whereby novel and improved means are provided to shoot the gas container to the front in case of necessity to balance and righten the plane in emergency cases and to produce a safe landing.

A further object of my invention is the provision of suitable locking means including a sliding sleeve for safely locking the spring propelled gas container or wing in their normal position during the ordinary flight.

A still further object of my invention is the provision of means for allowing convenient resetting of the gas container and parts co-operating therewith after each operation.

If the upper wing is forming the gas container additional means are provided to lock the same safely to the lower wing which can, however, readily be unlocked by the pilot in order to let the springs come to action and propel the upper gas containing wing forward to act as a parachute.

These and other objects and advantages of my invention will become more fully known as the description thereof proceeds and will then be specifically defined in the appended claims.

In the accompanying drawings forming a material part of this disclosure:

Fig. 1 is a fragmentary plan view of a parachute airplane constructed according to my invention.

Fig. 2 is a fragmentary sectional side elevation thereof, with the parachute gas bag extended.

Fig. 3 is the perspective view of a locking member and co-operating parts.

Fig. 4 is a longitudinal section through the airplane on line 4—4 of Figure 1.

Fig. 5 is a view similar to Figure 4, the section being taken on line 5—5 of Figure 1.

Fig. 6 is a fragmentary front elevation of the plane.

Fig. 7 is a side elevation of the plane.

Fig. 8 is a fragmentary front elevation of a bi-plane constructed according to my invention.

Fig. 9 is a fragmentary sectional elevation of another form of my invention.

As illustrated in Figures 1 to 7 the fuselage 10 of an airplane equipped with a wing 11 includes hollow guide bars or beams 12 in which slide the rods 13 under the action of springs 14.

To the front ends of bars or rods 13 is connected by means of brackets 15 or the like a gas container 16 of any suitable material and containing any suitable gas lighter than air.

To the lower face of the gas container 16 is secured, at its front end, as at 17, a longitudinal and rearwardly extending rod 18, slidably guided in suitable guide loops 19 on the upper faces of cross-bars 20 to the lower faces of which rollers 21 are secured by means of suitable hangers or brackets 22. A chain 23 is attached at its front end, as at 24, to the front end of the rod 18 and is guided towards the rear over rollers 21 and then back towards the front over a roller 25 at the upper front edge of the wing 11 and over a sprocket wheel 26 on a shaft journaled in a supporting bracket 27 and carrying a pair of crank arms or foot pedals 28 in front of the operator's seat 29.

The shaft 30 for the foot pedals carries also a ratchet wheel 31 adapted to be engaged and locked in its position by means of a pawl 32 pivotally secured intermediate its ends to a nose on bracket 27 and adapted to be locked in its locking position by means of a loop or eye 33.

After passing sprocket wheel 26 the chain 23 is guided over a roller 34 at the lower rear edge of wing 11 towards the rear and its end is attached to an eye 35 of a bow 36 (Figure 3), the ends of which are attached to pins 37 laterally extending from a bracket arm 38 depending from the rear end of the gas container 16.

The rod 18 is slidably guided through arm 38 and is adapted to enter with its rear end an opening 39 in the rear cross bar 40 of the fuselage having a recess 41 in its lower edge through which in the locking position of the parts passes the hooked end 42 of one arm of a bell-crank lever to engage behind crossbar 40.

The hooked arm of the bell crank lever is fulcrumed on pin 37 in a recess 43 of arm 38 and its other inclined and downwardly directed arm has pivoted thereto a wire loop 44 intermediate its ends the outer ends of which are attached to a pin 45 projecting from both sides of a sleeve 46 displaceably mounted on rod 18 and having other pins 47 projecting laterally therefrom to which the ends of a cord 48 are secured leading to the seat of the operator.

In operation during normal flight the hook 42 is engaged through recess 41 with the rear face of cross-bar 40 of the fuselage, and sleeve 46 is displaced towards the rear to engage arm 38 so that loop 44 will hold the arm of the bell crank lever to which it is attached in its downwardly directed position, and as springs 14 have the tendency to push gas container 16 and its rod 18 towards the front the hook will be securely kept in engagement with bar 40.

If, however, the gas container is to be used to outbalance the heavy front part of the airplane a pull exerted on cable 48 displaces the sleeve 46 on rod 18 towards the front, this movement of the sleeve will release the engagement of hook 42 with bar 40 and the springs 14 will be free to drive the gas container to the front.

As it is common knowledge that the front part of an airplane owing to the presence of the engine, operator, etc., is heavier than its rear, the gas container when firmly propelled by its springs will tend to righten the forward part about to go into a nose-dive and to balance the machine.

The return of the gas container into its normal position is effected by means of chain 23 and the pedals 28 which are then locked by means of pawl 32 and loop 33.

In the form of my invention illustrated in Figures 8 and 9, I have shown my invention applied to a two winged machine. The upper wing 49 forms the gas container and is held to the lower wing 50 by means of the hooks 51, 52, pivoted intermediate their ends as at 53 to brackets 54, 55.

The upper ends of the hooks engage eyes 56 on wing 49, and to the lower end of the hooks the ends of springs 57, 58, are attached the other ends of which are attached to pins laterally extending from posts 59, 60, on the faces of brackets 54, 55.

As shown in Figure 7 the airplane is driven by a conventional type of engine 61 driving front propeller 62, has front landing and starting gear generally indicated 63, vertical rudder 64, horizontal rudder 65 and rear landing runner 66.

It will be understood that I have described and shown the preferred forms of my invention as a few examples only of the many possible ways to practically construct the same, and that I may make such changes in the general arrangement of my device and the construction of its minor details as come within the scope of the appended claims without departure from the spirit of my invention and the principles involved.

Having thus described my invention, what I claim as new and desire to secure by Letters Patent is:

1. An aeroplane-parachute comprising a gas container, means for normally holding said container inoperative, means to catapult the container forward in cases of emergency, and means for resetting the container after each operation.

2. An aeroplane-parachute comprising a gas container on the wing of said aeroplane, hollow beams on the fuselage of the aeroplane, bars slidably arranged in said beams, means connecting said bars to the gas container, springs in said beams to catapult said beams and the gas container forward, means for normally holding said gas container inoperative, means for locking the container in its inoperative position, and means for resetting the container after each operation.

3. In an aeroplane-parachute a gas container above the wing of the aeroplane, a means for slidably supporting said gas container, a means for catapulting said gas container forward including a rod, a locking sleeve slidably supported on said rod, a bracket arm depending from said container having a recess, a bell-crank lever fulcrumed in the recess of said arm having one of its arms formed into a hook, a means connecting the other arm of said bell-crank lever to said sleeve, and a cross-beam on the fuselage of the aeroplane having a lower recess allowing the passage of the hooked end of said arm to engage the rear face of said cross-beam for locking said sleeve and rod and the gas container supported thereon in its inoperative position and a cable attached to said sleeve and operated by the pilot to release said hook to allow the catapulting means to come to action for catapulting the gas container forwardly for balancing the nose of the aeroplane in emergency cases.

4. In an aeroplane-parachute, a gas container, means to catapult said container forwardly, and means for returning said gas container into its normal position after each catapulting operation, said means comprising a chain attached at one end to the forward end of the gas container, a sprocket-wheel over which said chain is guided, a shaft for said sprocket-wheel, a crank on said shaft to rotate the wheel for winding said chain, an arm depending from the fuselage to which said chain is attached, and means for locking the sprocket wheel against rotation.

5. In an aeroplane having two superposed wings, one of said wings constituting a gas container, means for catapulting said gas containing wing forward, and means for locking said gas containing wing in its normal position of rest above the other wing, spring controlled hooks connecting both wings, and means for operating said hooks to disconnect the gas containing wing from the other wing to allow its forward catapulting.

6. In a bi-plane, an upper wing adapted to receive a gas lighter than air, a support for said wing allowing its forward movement, means to normally hold this wing in superposition and alignment to the lower wing, means to release said support, means catapulting the gas containing wing forward to project beyond the lower wing to balance the aircraft, spring controlled hooks connecting both wings, and cables for releasing said hooks to allow the catapulting of said upper wing.

7. In a catapulting device for parachute gas containers on aircraft, a guide rod, a sleeve movable on said rod, a hook engaging a cross-beam at the rear of the craft, and fulcrumed intermediate its ends, a means connecting said hook with said sleeve allowing a locking of said hook in its beam engaging position and a cable for sliding said sleeve on said rod to disconnect said hook from the cross-beam, and springs for propelling the gas container forward upon the release of said hook.

Signed at New York, in the county of New York, and State of New York, this 29th day of April, A. D. 1931.

FRANK LOSKE.